US010661623B2

(12) United States Patent
Edwards et al.

(10) Patent No.: US 10,661,623 B2
(45) Date of Patent: May 26, 2020

(54) MULTI-MODAL FLYING AIRPLANE AND UNDERWATER GLIDER

(71) Applicants: Daniel J. Edwards, Alexandria, VA (US); Jeffrey W. Book, Slidell, LA (US); Trent Young, Alexandria, VA (US); Andrew Quaid, New Orleans, LA (US)

(72) Inventors: Daniel J. Edwards, Alexandria, VA (US); Jeffrey W. Book, Slidell, LA (US); Trent Young, Alexandria, VA (US); Andrew Quaid, New Orleans, LA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/909,508

(22) Filed: Mar. 1, 2018

(65) Prior Publication Data
US 2019/0270355 A1    Sep. 5, 2019

(51) Int. Cl.
| B63G 8/22  | (2006.01) |
| B60F 5/02  | (2006.01) |
| B64C 37/00 | (2006.01) |
| B63G 8/00  | (2006.01) |
| B64C 3/10  | (2006.01) |

(52) U.S. Cl.
CPC ............. *B60F 5/02* (2013.01); *B63G 8/001* (2013.01); *B63G 8/22* (2013.01); *B64C 3/10* (2013.01); *B64C 37/00* (2013.01); *B63G 2008/002* (2013.01)

(58) Field of Classification Search
CPC .............. B60F 5/02; B63G 8/22; B63G 8/001
See application file for complete search history.

(56) References Cited

U.S. PATENT DOCUMENTS

| 8,205,570    B1 * | 6/2012 | Tureaud  | B63G 8/14   |
|                   |        |          | 114/330     |
| 10,331,131   B2 * | 6/2019 | Hanson   | G05D 1/0088 |
| 2011/0226174 A1 * | 9/2011 | Parks    | B60F 5/02   |
|                   |        |          | 114/313     |
| 2015/0266576 A1 * | 9/2015 | Hobbart  | B60F 5/006  |
|                   |        |          | 244/2       |

\* cited by examiner

*Primary Examiner* — Stephen P Avila
(74) *Attorney, Agent, or Firm* — US Naval Research Laboratory; Richard Bis

(57) ABSTRACT

A multi-modal vehicle includes a main fuselage body; one or more wings extending from the main fuselage body and having a shape configured to provide aerodynamic lift when the vehicle travels through the air and hydrodynamic lift when the vehicle travels through the water; and a buoyancy control engine situated within the vehicle and configured to control the buoyancy of the vehicle relative to surrounding water when the vehicle is submerged in water, thereby providing a buoyancy force to selectively propel the vehicle upwards and downwards, respectively, through the water.

5 Claims, 2 Drawing Sheets

MULTI-MODAL FLYING AIRPLANE AND UNDERWATER GLIDER

RELATED APPLICATIONS

This application claims the benefit of U.S. Provisional Application No. 62/465,594 filed Mar. 1, 2017, which is hereby incorporated herein by reference.

FIELD OF INVENTION

The present invention relates generally to unmanned vehicles, and more particularly to multi-modal vehicles having air and sea capabilities.

BACKGROUND

Autonomous underwater gliders are well-established sensing systems for long-range (trans-oceanic), deep (>1000 m), and long-endurance (several months) oceanographic data collection. These craft move through the water using variable buoyancy to initiate a climb/descent through the water column. By balance of hydrodynamic forces and moments, wing surfaces provide lifting force that transfers some of the vertical motion into horizontal translation. This means of locomotion is extremely efficient, and small underwater gliders have been demonstrated crossing entire oceans. However, underwater gliders are typically limited in top-speed to approximately 30 cm/s for cruise speed, with larger gliders reaching almost 1 m/s.

However, when rapid response is required, or when traversing over high current areas that would otherwise be unreachable by a conventional underwater glider, other means of propulsion is desirable.

SUMMARY OF INVENTION

Therefore, disclosed are vehicles and methods for travelling long distances at high speed above the water, then entering the water and providing long-endurance underwater travel using, for example, a buoyancy engine for underwater locomotion. This combination of capabilities may be accomplished by shaping the vehicle mold-lines such that the wing provides both aerodynamic and hydrodynamic lifting force. Such a vehicle could be used to fly up-current, up-river, or to a land-locked body of water and enter the water at a location closer to the underwater target. While underwater, the vehicle can translate and re-position itself relative to a mission objective location, and/or egress to a recovery location while still underwater.

The design considerations for flying and swimming machines are quite different, however. Conventional aircraft are thin-skinned and filled with air, whereas conventional submarines have thick watertight hulls and carry enough ballast to be neutrally buoyant.

According to one aspect of the invention, a multi-modal vehicle includes a main fuselage body; one or more wings extending from the main fuselage body and having a shape configured to provide aerodynamic lift when the vehicle travels through the air and hydrodynamic lift when the vehicle travels through the water; and a buoyancy control engine situated within the vehicle and configured to control the buoyancy of the vehicle relative to surrounding water when the vehicle is submerged in water, thereby providing a buoyancy force to selectively propel the vehicle upwards and downwards, respectively, through the water.

According to another aspect a method for vehicle locomotion using a multi-modal vehicle, the method comprising the steps of: flying through the air using aerodynamic lift generated by one or more wings to provide vehicle lift; transitioning from the air into the water; and gliding through the water using hydrodynamic lift generated by the one or more wings to provide vehicle translation through the water and using a buoyancy engine to alternatively cause the vehicle to float and sink through the water using buoyancy force.

The foregoing and other features of the invention are hereinafter described in greater detail with reference to the accompanying drawings.

DETAILED DESCRIPTION

Figure 1:
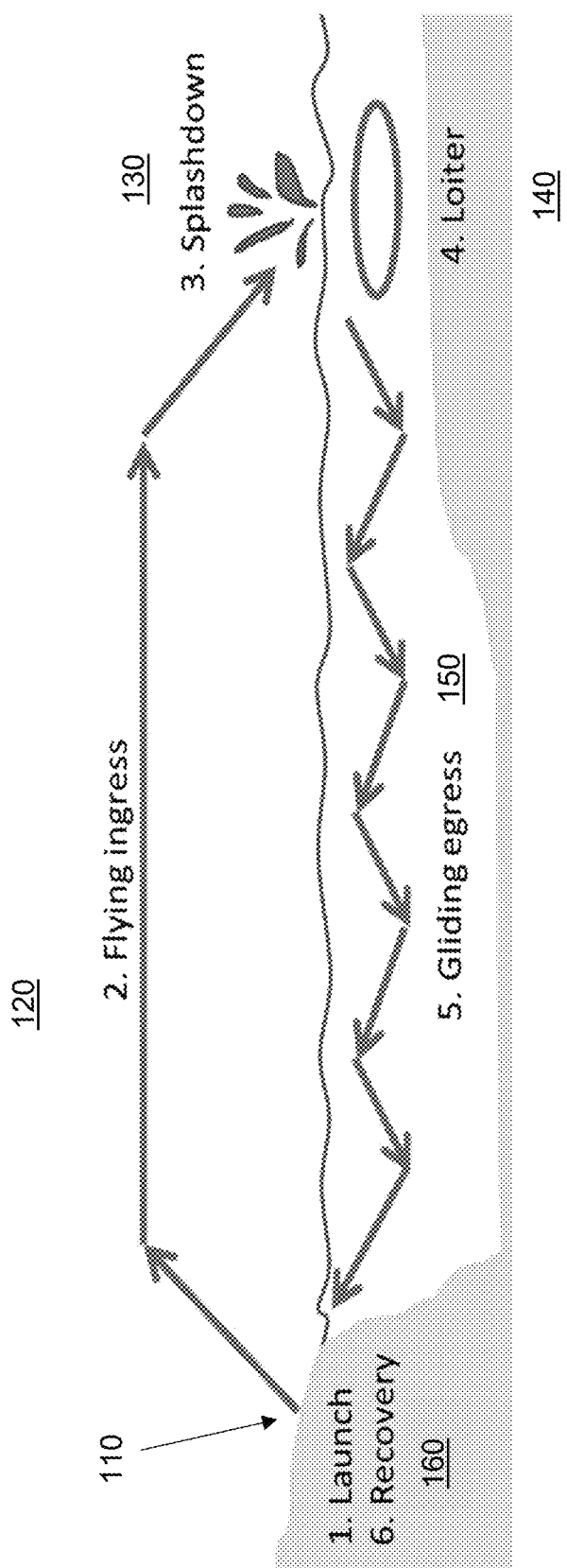
FIG. 1 shows a schematic mission profile diagram for an exemplary multi-modal vehicle.
Figure 2:
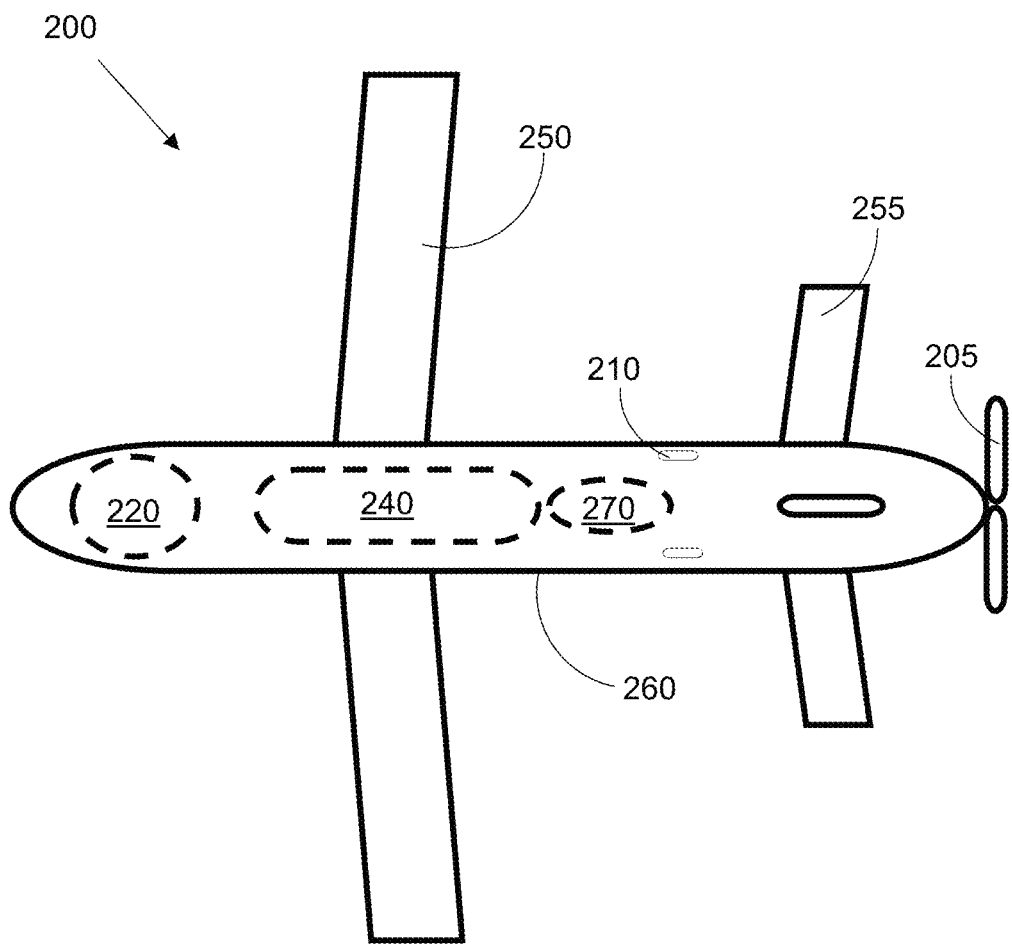
FIG. 2 shows a schematic of an exemplary multi-modal vehicle.

Looking first at FIG. 1, an exemplary vehicle may be launched into the air at 110 via a number of options. It can perform a rolling takeoff; be launched from a rail using pneumatic, spring, and/or rocket propulsion, for example; be air-launched as a drop payload from another aircraft, balloon, or rocket; or be launched from the water surface. Like conventional vehicles, exemplary vehicles may be launched from the sides of ships using a crane or a small dolly.

Once in the air, an exemplary vehicle may fly 120 under its own power using a propulsion system 205 meant for the air. Options include—but are not limited to—jet, electric motor, or internal combustion engine. If using a propeller system or other mechanism with protruding parts, system elements (such as propeller shafts) can fold or retract to help reduce drag when in the water. Alternatively, in some embodiments, such systems may be used in original or modified form for underwater propulsion, for example, for loiter propulsion or burst power.

In some exemplary systems, an automatic control system provides guidance in the air using movable control surfaces (traditional aircraft controls) or mass-shifting of weight (similar to a hang-glider). The net result is a means to steer the aircraft to a desired attitude and toward a desired landing location.

Splashdown 130 may be accomplished in one of four major ways. 1. A traditional landing puts the vehicle in a normal flight attitude, with a touchdown on the bottom of the hull. 2. A plunge dive lands the vehicle at flight speed but in a nose-first attitude entering the water. 3. A spinning landing puts the vehicle in an auto-rotative state such as a flat spin and lets it stay in this configuration until hitting the water. 4. A decelerated landing uses a parachute or other high drag device to reduce the flight speed and let the vehicle enter in a primarily vertical descent profile; the attitude of the vehicle as it enters the water may be controlled by the attachment location of the drag device.

Once in the water, the vehicle submerges using one or multiple flooding ports 210 such that water can displace air contained in the hull. Some areas may not flooded In order to protect electronics and provide working fluid for the buoyancy engine. The end result is a vehicle that is slightly negatively buoyant and it submerges.

While underwater, the vehicle may loiter 140 at a particular area at a particular depth, or may move through the water.

In exemplary embodiments, locomotion 150 is provided by the buoyancy force and a balance of hydrodynamic static moments relative to the dynamic lifting moments provided by the production of lift. This results in a characteristic saw-tooth motion of ascents and descents during translation. If the hydrodynamics are set up for efficient lift production, the glide angle can be shallow and result in fewer buoyancy change cycles per distance travelled.

Once finished, an exemplary vehicle may be discarded or recovered 160.

Vertical motion underwater is controlled by the buoyancy control engine 220 varying the volume of a fixed mass, resulting in a net buoyancy force. The buoyancy engine can change the net buoyancy of the vehicle from slightly negative (sink) to slightly positive (float). Options for buoyancy control include pumping oil from inside a fixed volume to a variable-volume bladder, or moving a piston with a rolling seal to provide variable volume using direct mechanical force.

Underwater, the vehicle has two main control modes. 1. A mass-shifting mechanism 240 can change the location of the center of mass relative to the center of buoyancy, thus changing the static pitch or roll attitude of the vehicle in the water. 2. Control surfaces on the wings 250 and/or tail 255 provide dynamic control authority for maneuvering. All control modes result in ability to put the vehicle in a commanded pitch, roll, and yaw attitude.

The aero and hydrodynamics for flying and underwater gliding are nearly identical with the exception of buoyancy terms added for underwater operation. The operating conditions, however, are substantially different. While typical small-unmanned flying vehicles operate at velocities in the 10-60 m/s range, sea gliding vehicles often cruise at less than 0.5 m/s. The density of water is about three orders of magnitude greater than air, and the Reynolds numbers (ratio of inertial to viscous forces) while gliding are much lower than typical for flight.

Even more significant, the structural requirements and mass properties of the two configurations are vastly different. While flight vehicles are designed to be as light as possible and with a wing which can support several times the vehicle dry weight, underwater glider structural mass is dominated by the pressure vessel designed to resist pressure at depth, while lift forces are limited to some fraction of the net buoyancy force. Further, to operate as an underwater glider, the vehicle should be neutrally buoyant at a center-stroke buoyancy engine position. At that condition, the displaced water mass must equal the dry mass of the vehicle. This means the amount of displaced water will necessarily select the vehicle flying dry mass. Dry mass directly drives the power required to sustain level flight and the structural weight of the flying configuration, making it critical to reduce the trapped air volume as much as possible to keep flying mass (ergo power required) to a minimum.

Aircraft are typically constrained by a maximum lift coefficient which drives takeoff/launch velocities and/or wing sizing. After the wing sizing is defined, the amount of loaded mass available for buoyancy modification and the desired operating underwater glide path will determine the underwater gliding performance.

Examining a notional flying sea glider configuration with a flying mass of 25 kg and a loaded mass of ±0.2 kg, for example, it is apparent that the faster the flight stall velocity, and therefore the smaller the wing, the better the underwater performance. This is because, for a typical flying vehicle with a typical launch velocity, the flight wing will generally be larger than a typical sea-gliding wing.

Further improvements in gliding speed can be achieved by increasing the amount of variable buoyancy, given that the hull hydrodynamics are fixed. Using air as the working fluid is lighter than using an oil-bladder mechanisms; increasing the variable volume is thus possible by stretching the mechanism stroke length and avoiding rapid mass growth.

An exemplary fuselage 260 is a two-piece, hollow-molded fiberglass part built from female molds. The monocoque skin is the primary structural element and the wing, tail, and internal components mount to the skin. On the aft end of the fuselage, a firewall bulkhead allows bolting a small electric brushless motor for propulsion.

Both the wings and the tail surfaces are hollow-molded fiberglass skins. The wings each have a single plain flap control surface for roll axis control. The tail surfaces are full flying for ease of manufacture and actuation. Small holes drilled into the skin enable flooding.

One pressure vessel 270 mounted inside the fuselage houses the electronics and battery. An inertial measurement unit, depth pressure sensor, microcontroller, and Wi-Fi module control the vehicle under the water. A single 2-cell 1.5 Ah lithium polymer battery provides power.

For underwater gliding, a piston-based buoyancy control system may be used. For example, in one exemplary embodiment, two syringes were used with waterproof (IP67) servos driving a lead screw to push the stock rubber gasket piston. The servo and piston assembly are on the flooded side. The buoyancy engine dry side is vented to the pressure vessel to use its air as a plenum. Together, the two buoyancy engines provide approximately ±75 mL of variable volume. Mounting the buoyancy engines in the nose of the vehicle provided both buoyancy and pitch trim in the correct direction.

Another syringe with a ballast-filled piston and no air cavity was added for mass shifting control. The 200 g piston can be moved approximately ±2 cm. This addition proved to be ineffective for pitch control. Reasons for this are two-fold, resulting from the insufficient fraction of mass being shifted to move the center of gravity (CG), and the distance between the CG and center of buoyancy (CB) being relatively large.

Weight and balance was critical to the setup of the vehicle. First, the CG location was selected based on a desired stability margin for flight, placing the CG at approximately the wing quarter chord.

The CG location choice also selected the CB location, as it must be at the same longitudinal location for level trim and below the CG for positive righting moment stability. To achieve a symmetric glide cycle, the vehicle CB was determined at the half-stroke position on the buoyancy engines.

Since vehicles may be highly sensitive to added weight and buoyancy, in an exemplary embodiment, internal components were temporarily mounted and the vehicle was trimmed for neutral buoyancy and level trim angle using a combination of foam and floatation ballast. The CG location was placed as low as possible and the CB location placed as high as possible within the hull to tailor pitch to buoyancy engine coupling to approximately 30 degrees at full buoyancy engine stroke.

A significant amount of weight was needed to achieve neutral buoyancy at the buoyancy engine half stroke, even though most of the internal vehicle volume was flooded; this highlights the need to minimize trapped air volume.

Meeting both the desired CG and CB location necessitated adding both ballast and floatation foam to the nose.

In exemplary vehicles, a plunge landing with a steep pitch angle does not provide as slow of a deceleration force rise as a planning method of landing. However, it does load the (fuselage) structure in a relatively advantageous direction and provides a long deceleration time prior to the wing or tail surfaces touching the water. The best landing method for an exemplary embodiment was a shallow approach and a pushover maneuver (instead of a flare) that put the nose into the water at approximately 45 degrees. This technique resulted in a reasonably slow entry speed and still allowed the nose to penetrate first to provide primary deceleration force prior to the wing and tail surfaces hitting water. No damage was noted after testing this landing technique.

When it enters the water, sections of its body, including the wings, may fill with water until it is dense enough to glide underwater at depths of, for example, up to 200 meters.

Following flying ingress with a splashdown landing, the final performance objective of an exemplary vehicle is to maneuver underwater using a buoyancy engine for propulsion.

Measurements of an exemplary embodiment have showed glide speeds as fast as 12 cm/s and a max glide ratio of 2.5, resulting from a 4-degree angle of attack (AoA). Glide path angles varied between 21 to 40 degrees and AoA ranged between 4 to 30 degrees. The large AoA resulted in stalled lift on the wings, reducing the L/D achieved. Additional pitch angle control would have helped reduce AoA and increased the L/D ratio: the minimum tested AoA was 4 degrees and achieved the highest L/D at 2.5.

Elevator and ailerons were held streamlined during all glides. However, a more advanced controller could deflect the ailerons as flaperons to provide airfoil camber for improved lift capabilities and the elevator could be used to control angle of attack.

The full-flying rudder deflected to approximately 30 degrees provided a 5 m diameter turn. Turns were accomplished without any aileron deflection, as the natural stability from righting moment was sufficient to maintain wings-level attitude.

Measurements of the exemplary vehicle performance validate that the airborne flight segment is rapid (>30 m/s) when compared to the underwater gliding speed (12 cm/s). This supports the premise of using flying for ingress above the water surface and gliding below the surface for efficient underwater transport.

Thus, several improvements over current methods of emplacing underwater vehicles or sensors, particularly in time-critical situations, are achieved by exemplary craft.

First, the hull lines for exemplary vehicles may be the same for flying and underwater operation. This means the aerodynamics and the hydrodynamics are linked. In exemplary embodiments where no parts are jettisoned, the vehicle is more covert, since there is no evidence of the vehicle except the vehicle itself. Aircraft-specific items can be dropped off the hull, such as tails or parachutes, to reduce drag in the water, and these can be engineered to either sink or float away in order to maximize covert operation in such embodiments.

Second, by flying over water, the ingress speed can be much faster for a given amount of energy than trying to move through the water. Water is 1000 times denser than air, so the amount of energy to move through air is greatly reduced by comparison. It is much less energy intensive to move through air than water.

Third, by using buoyancy for underwater locomotion, the vehicle can use its onboard energy stores efficiently to move a long distance underwater.

Fourth, both the buoyancy engine and an electric motor for airborne propulsion can share the same electric battery power source to vary distance travelled in the air versus underwater, giving flexibility in mission planning.

Fifth, the control surfaces or weight-shift mechanism used for airborne control can be the same mechanism for underwater control, providing a means of dual-use of the equipment, thus saving weight not having completely separate control systems.

Sixth, by running the air propulsion electric motor underwater, the vehicle can move without running the buoyancy control system, providing ability to hold a depth and potential of faster underwater speeds (>5 kt compared to <1 kt for gliding).

Seventh, by being able to translate the vehicle by using a buoyancy engine, there are periods of time while gliding when the vehicle is making no sound other than its own motion through the water. As such, it is extremely quiet and can be used for sensitive acoustic missions or with sensitive acoustic sensors.

Some alternative embodiments may include one or more components (for example, the wings or parts thereof to retract or be shed upon transition from air to water.

Also, some exemplary embodiments may include additional options for underwater positioning and movement including, for example, one or more pectoral fins for fine maneuvering under water. Such fins may be retractable or foldable such that the fins are not exposed during flight or during transition from air to water. Such fins may, for example, incorporate chordwise flexibility through the use of spring-loaded hinges at the base of the ribs, which provide fore-aft motion maintaining the tension between segments of the membrane.

A main benefit of this combination of capabilities is rapid reaction. Exemplary embodiments can carry sensors for various purposes, such as detecting algae blooms or finding oil slicks from crashed airplanes quickly. With its flying capability, exemplary embodiments can reach water-deployment locations faster and often more effectively than traditional unmanned underwater vehicles (UUVs).

Exemplary embodiments may be "affordably expendable," i.e. they may be produced at a price point where recovery becomes unnecessary when the situation requires. In other applications, exemplary embodiments could launch, splash down, take samples or gather other data, then a vehicle could pick up such a vehicle and confirm its findings. Several exemplary vehicles could operate together, each going out to different parts of a response area to perform an individual operation but providing information that combines to a more complex mission.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A multi-modal vehicle comprising:
   a main fuselage body;
   one or more wings extending from the main fuselage body and having a shape configured to provide aerodynamic lift when the vehicle travels through the air and hydrodynamic lift when the vehicle travels through the water;
   a buoyancy control engine situated within the vehicle and configured to control the buoyancy of the vehicle relative to surrounding water when the vehicle is submerged in water, thereby providing a buoyancy force to selectively propel the vehicle upwards and downwards, respectively, through the water, and
   a parachute or other high drag device configured to deploy at a time and in a manner to reduce flight speed and enable the vehicle to enter water in a primarily vertical descent profile.

2. A method for vehicle locomotion using a multi-modal vehicle, the method comprising the steps of:
   flying through the air using aerodynamic lift generated by one or more wings to provide vehicle lift;
   transitioning from the air into the water; and
   gliding through the water using hydrodynamic lift generated by the one or more wings to provide vehicle translation through the water and using a buoyancy engine to alternatively cause the vehicle to float and sink through the water using buoyancy force,
   wherein the step of transitioning includes deploying a parachute or other high drag device to reduce flight speed and enable the vehicle to enter the water in a primarily vertical descent profile.

3. The vehicle of claim 1, wherein at least one of the fuselage body or the one or more wings are floodable, thereby reducing buoyancy and strength requirements.

4. The vehicle of claim 1, wherein the one or more wings are fixed with respect to the fuselage.

5. The method of claim 2, further comprising the step of flooding at least one of the fuselage body or the one or more wings.

* * * * *